STARTING NEXT IDLE REGISTER

Filed Sept. 27, 1952 6 Sheets-Sheet 1

INVENTOR.
LEON H. REAGAN
BY Johannes W. Whitesel
ATTORNEY

Jan. 10, 1956 L. H. REAGAN 2,730,568

STARTING NEXT IDLE REGISTER

Filed Sept. 27, 1952 6 Sheets-Sheet 2

INVENTOR.
LEON H. REAGAN
BY Johnson & Whitesel
ATTORNEY

INVENTOR.
LEON H. REAGAN
BY [signature]
ATTORNEY

INVENTOR.
LEON H. REAGAN
BY J. Warren Whitesel
ATTORNEY

INVENTOR.
LEON H. REAGAN
BY J. Warren Whitesel
ATTORNEY

Jan. 10, 1956 L. H. REAGAN 2,730,568

STARTING NEXT IDLE REGISTER

Filed Sept. 27, 1952 6 Sheets-Sheet 6

INVENTOR.
LEON H. REAGAN
BY [signature]
ATTORNEY

1

2,730,568

STARTING NEXT IDLE REGISTER

Leon H. Reagan, Richland, Wash., assignor, by mesne assignments, to General Dynamics Corporation, a corporation of Delaware Application September 27, 1952, Serial No. 311,845

27 Claims. (Cl. 179—18)

This invention relates to a digit transmitting device suitable for use in connection with an operator's position and more specifically to a keysender.

Most automatic telephone equipment is adapted to utilize a series of control pulses for the purpose of directing automatic switches to make connection with a called line. A great many schemes have been developed for producing these control pulses. For example, the well-known telephone dial produces a pulse train containing a variable number of impulses determined by the particular finger hole selected. Still other systems may require pulse transmitting devices which are in the form of a keyboard wherein any given key may be depressed to send a particular train of control pulses in accordance with the designation indicated by that particular key. It is desirable to furnish such a keysending device with manual position switchboards since it saves considerable time because the operator does not have to wait until the entire train of control impulses have been transmitted before she may transmit the next digit indication. This is especially true where the manual position has access to an intertoll dialing network.

Keysenders have taken many forms in the past. For example, a key set may control a storage circuit of the type commonly called a "register" to store a marking which is indicative of the particular key which was operated. This marking in turn may cause another circuit which is called a "sender" to transmit a train of control impulses comprising a variable number of impulses which are representative of the marking just stored in the register.

Register sender circuits of this type may be connected directly to the switchboard or they may be arranged on a percentage basis whereby a register sender may serve a plurality of switchboards. When the register sender devices are arranged on a percentage basis, a complicated switching device must be provided for assigning idle register senders and for properly completing all required connections between the key set and the register sender. I have found that service is best where an inexpensive register sender is connected directly to the operator's switchboard on an individual basis since this eliminates the complicated switching necessary for percentage operation and since maintenance is reduced and facilitated because trouble may be traced more readily.

Therefore, an object of my invention is to provide a keysender having an inexpensive and simplified design.

Another object of my invention is to provide a simple register sender individually connected with an operator's switchboard.

Still another object of my invention is to provide a plurality of register circuits wherein as each register is used, it automatically preassigns the next available register.

A further object of my invention is to provide a signal means for selectively indicating when a register is idle, when a register has been seized and when a register contains stored information.

I accomplish the above described objects by providing ten digit keys located at the operator's position, each key

2 being connected to one or two control relays which are operated as long as a digit key is actuated. One of a plurality of register circuits is marked by the control relays selectively according to the digit indication transmitted by the actuated key; however, the register is provided with a locking circuit to maintain the stored digit marking after the digit key and control relays are released and until the sender completes the transmission of a pulse train representative of the indicated digit.

A signal means is provided to indicate each stage of registration; for example, in the particular embodiment of my invention shown in the drawings, this signal means comprises a lamp which glows at reduced brilliance when the register is the next one to receive registration and after storage is complete the lamp glows at full brilliance until the register circuit becomes idle at which time the lamp goes out.

The operator proceeds to key the digits as desired. As each digit is registered, another of the plurality of register circuits is assigned in order for storing the next digit. A sender sequentially transmits a train of digit impulses corresponding to the digit marking stored in each register, each register again becoming idle after such transmission. The registers are then reassigned in sequential order for following digit registration; hence the assignment of registers may be considered as a "closed circle operation." That is, a register is assigned and a digit is stored therein after which the next register in order is assigned as are all remaining registers right around the "circle." The sender transmits a train of control pulses representing the first stored digit after which it transmits pulses representing the digit stored in the next register and in the remainder of the registers around the "circle," each register again becoming idle after the pulses representing its stored digit are transmitted by the sender. Thus, the sender follows the register around the "circle"; however, there will be some lag since the sender cannot transmit as fast as an operator can key digits. By the time the register has gone around the "circle" and has returned to the starting point, the first register is again idle and hence reused. If enough register circuits are provided, the "circle" becomes so big that the operator cannot key digits fast enough to fill all registers and thus overtake the sender so as to make further registration impossible. While if only a few register circuits are provided, the "circle" becomes so small that the operator must key digits slowly or else the registering process will overtake the sending process. Should this happen, a signal will notify the operator that she must stop keying. If she ignores the signal and continues, her keying is ineffective.

Since the sender transmits promptly following the keying of each digit as soon as possible, and since sending the longest digit (ten pulses) requires a known interval of time, the number of registers required may be predicted accurately. For example, I have found that eight register circuits provide very good, high grade intertoll service.

The operator position including the key set and control circuit is connected with the register sender circuits on an individual basis by means of a suitable removable connection, such as a patching cord, for example, so that different register circuits may be assigned to a particular operator as required since it may be necessary to remove a register sender from service at periodic intervals for maintenance, due to mechanical failure or for other reasons.

A more complete understanding may be had from the accompanying drawings and specification. The drawing uses conventional symbols for indicating well known telephone components. As in the case of most telephone systems, the positive or (+) pole of the battery may be grounded while the negative or (−) pole provides a source of battery potential.

Figs. 1*a* and 1*b* show a block diagram illustrating how my invention connects into a conventional telephone system.

Fig. 2 shows a key set and a control circuit individual thereto.

Figs. 3 and 4, when joined properly, show two register circuits.

Figure 1A:
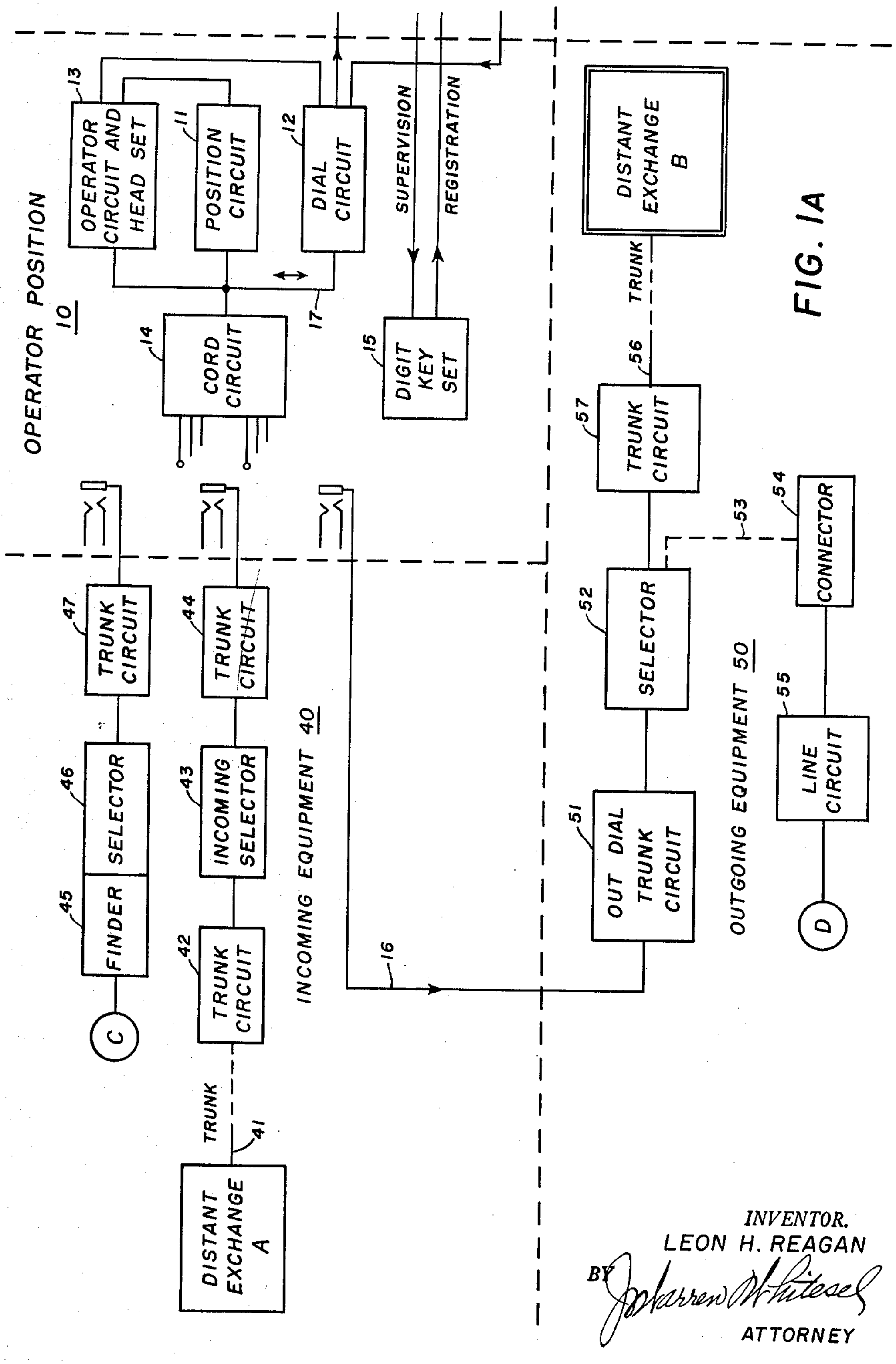
Figures 1B, 6:
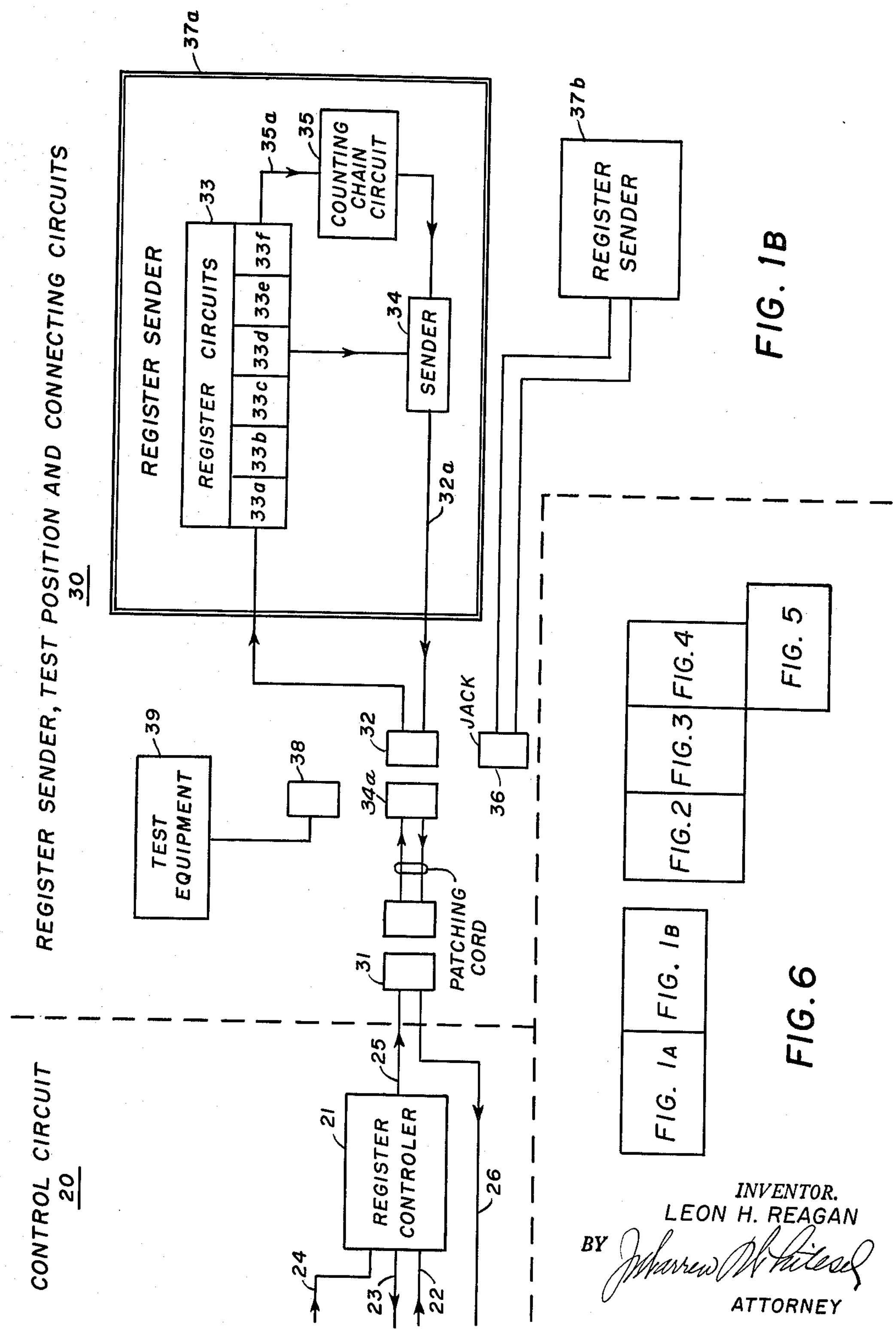
Fig. 6 shows the manner in which the other figures should be joined to make a complete circuit drawing.

Fig. 1 is a schematic diagram of how the subject invention may be connected into a telephone system. Briefly, an operator's position 10 is provided with a position circuit 11, a dial circuit 12, an operator's circuit and headset 13 and a plurality of cord circuits, one being shown as element 14—all of which may be more or less conventional design. One key set 15 is provided at each position as means by which the operator of position 10 may control the transmission of various trains of control impulses. Control circuit 20 is provided with registration connection 22, supervision connection 23, and control connection 24 for interjoining digit key set 15, dial circuit 12 and register controller 21. For the purpose of explanation, each of these connections is shown as an individual conductor; however, it should be understood that each may represent many suitable connections. Register controller 21 is connected to a suitable terminal means 31, such as a jack, for example, by a group of conductors shown schematically by the single line 25. Another suitable terminal means 32 is individually connected with a group of register circuits 33 contained in register sender **37*a*. A removable connection, such as patching cord provided with two plugs, for example, is adapted to interconnect terminals 31 and 32. If register 33, sender 34, or counting chain circuit 35 should develop trouble, require maintenance or otherwise be removed from the service of operator position 10, removable connection 34*a* may be disconnected from terminal 32 and connected with terminal 36 thereby substituting register sender 37*b* for register sender 37*a*—it being understood that register sender 37*b* may be substantially the same register sender 37*a*. If it should be necessary to test any of the various elements in either of the register senders 37*a* or 37*b*, a maintenance man will connect terminal 38 with either of the terminals 32 or 36, as required, and any suitable test equipment 39 may be utilized to perform desired tests. Elements 40 and 50 show conventional incoming and outgoing telephone networks which may be connected by means of a plug and jack arrangement to operator position 10, control circuit 20 and register sender, test position and connecting circuits 30**.

At this time, it may be well to describe briefly several calls as specific examples of how the various elements of Fig. 1 cooperate and how the subject invention functions. Obviously, many other similar examples also could be given.

First, let it be assumed that a subscriber in distant exchange A wishes to call subscriber D who is local to the exchange at which operator position 10 is located. Trunk 41 may be seized from the distant exchange A by any suitable means, such as an outgoing operator (not shown), for example, and the call may be extended to an incoming trunk circuit 42 which is included within the exchange local to operator position 10. Trunk circuit 42 has access to incoming selector 43 which may be controlled to seize an idle trunk circuit 44 which is associated with a jack accessible to the operator of position 10 who may answer the call through the use of a suitable plug which is a part of cord circuit 14. The operator converses with the calling party, by means of operator circuit and headset 13, and learns that the call is for subscriber D. Key set 15, together with dial circuit 12, function to control the digit pulse train which is necessary for completing the connection. More specifically, the key set is provided with ten keys which transmit a control marking over registration conductor 22 to register controller 21.

Assuming that terminals 31 and 32 are interconnected as shown in the drawing, register controller 21 repeats a digit registration marking over cable 25 to register circuits 33 where an indication of the keyed digit is stored. This stored indication serves to mark counting chain circuit 35 by way of cable **35*a* while the counting chain counts the number of pulses required to reach the indication stored in register circuit 33. Sender 34 is provided with a pulse source which transmits a pulse over an out pulse conductor 32*a* and simultaneously therewith steps the counting chain to search for the marked indication extended over cable 35*a*. Transmission of these pulses ends when the marked conductor is found by the counting chain. These pulses are transmitted over connection 34*a* and conductor 26 to dial circuit 12, conductor 17 and cord circuit 14, to out-dial trunk 51 by way of conductor 16. This pulse train serves to direct selector 52 to an idle trunk such as 53 which leads to connector 54. Subsequent pulse trains may direct any desired number of switches (not shown) including connector 54 to seize line circuit 55** and subscriber D.

Returning to the operation of key set 15, it is not necessary for the operator to wait until the entire train of digit pulses is transmitted. Rather, register 33 is provided with a plurality of individual register storing circuits **33*a*, 33*b*, 33*c*, 33*d*, 33*e* and 33*f*, each of which is adapted to store an individual digit. These storage circuits are preassigned in order and when the last storage is reached, the first is once more assigned, assuming that it is now idle, and the preassignment process repeated. The number of register storage circuits such as 33*a*, 33*b***, etc., which are required depends upon how fast an operator is able to operate the digit keys. That is, for high quality service there must be enough register storage circuits so that the first used is again idle before the digit registration in the last register is complete. I have found that eight storage circuits provide adequate facilities for most intertoll operators while four storage circuits may be sufficient for most local operators. This difference is occasioned by the number of digits which the operator must key in each case.

To illustrate, let it be assumed that the first digit was registered in storage circuit **33*e* since storage circuit 33*d* was the last to be used in the call immediately preceding this one. The operator proceeds to key the necessary digits as fast as she wishes. The second digit is stored in circuit 33*f*, the third digit is stored in circuit 33*a*, the fourth digit is stored in 33*b*, and so forth. Meanwhile sender 34 follows each digit registration by transmitting a pulse train for each digit in the order stored. As fast as sender 34 transmits the pulse train over conductor 32*a*, the particular register storage circuit involved, 33*e* for example, becomes idle and the sender transmits digits indicative of the marking stored in the next storage circuit, 33*f* for example. Hence, it will be seen that in the specific example of register circuits 33, as shown in the drawing, the operator may be keying as many as six digits ahead of sender 34 since after the sixth digit she again will use the first register storage circuit, in this illustration circuit 33*e***.

Next, let it be assumed that a subscriber in distant exchange A wishes to converse with a subscriber in distant exchange B in which case operator position 10 is part of a tandem call. If the operator in distant exchange A is not provided with means for controlling the switches of telephone networks 40 and 50, the call will be completed as described above in connection with the call to subscriber D; however, this time selector 52 seizes trunk circuit 57 and trunk 56 leading to distant exchange B. The operator at position 10 either may key digits to operate selector 52 and leave control of equipment at distant exchange B to an operator located thereat; or, she may transmit control pulses for operating selector 52 and automatic equipment (not shown) in distant exchange B if intertoll dialing facilities are provided. In some cases, it may be desirable to provide register senders such as elements 37*a* and 37*b* accessible to incoming selector 43 and trunk circuit 44.

Calls local to operator position 10 may be completed in a manner substantially similar to the above described calls from distant exchange A. For example, the telephone circuit of subscriber C may be extended by way of finder switch 45, selector switch 46 and trunk circuit 47 to cord circuit 14 where operator 10 determines the destination of the call. If the call is for a local subscriber, such as D, for example, operator 10 may key a digit indication individual to that subscriber or, if the call is long distance to exchange B, she may key a digit indication whereby selector 52 is operated to seize trunk circuit 57 and trunk 56, for example. Subsequent pulses may control automatic equipment (not shown) in distant exchange B if intertoll dialing facilities are provided.

Figure 2:
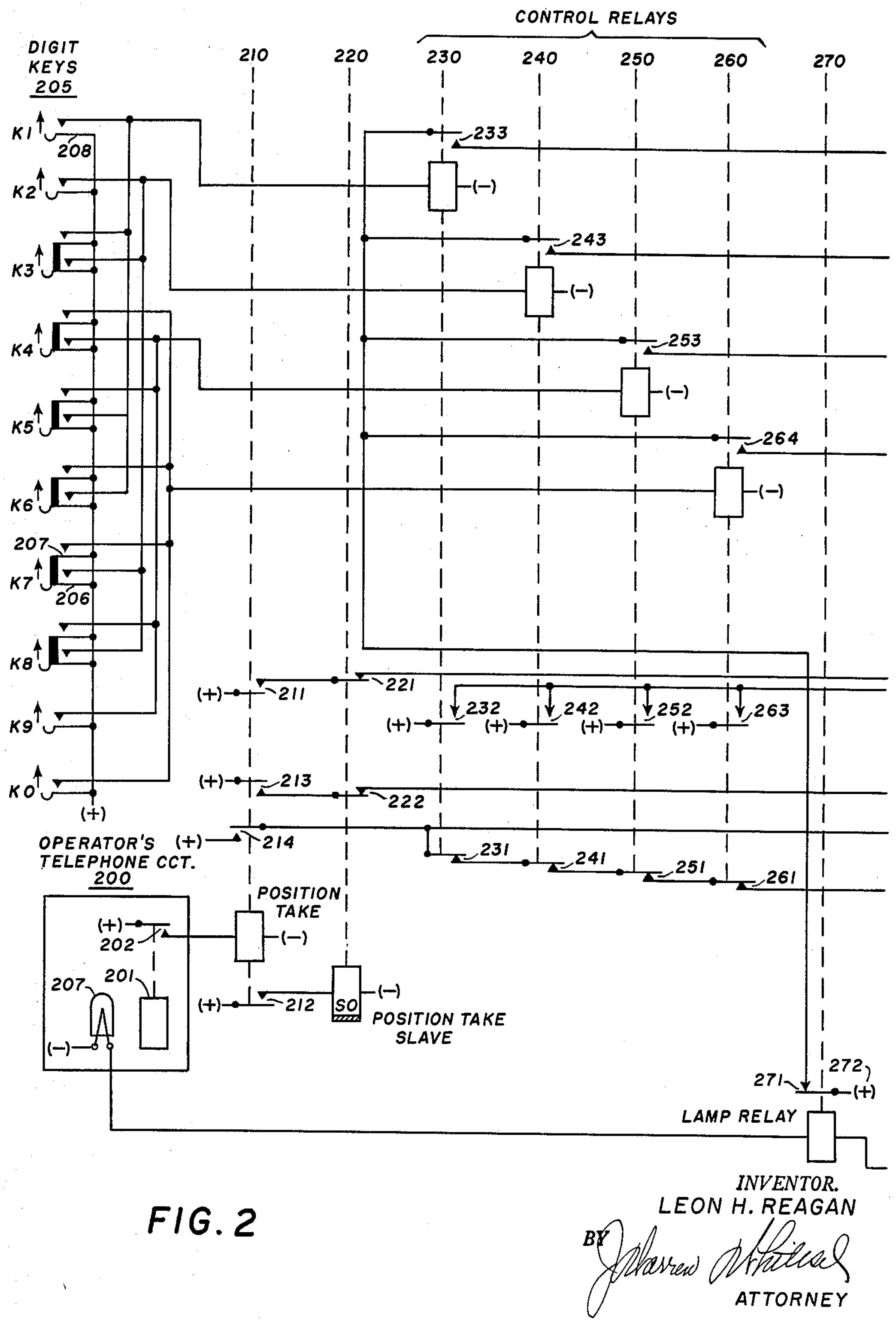
Figure 3:
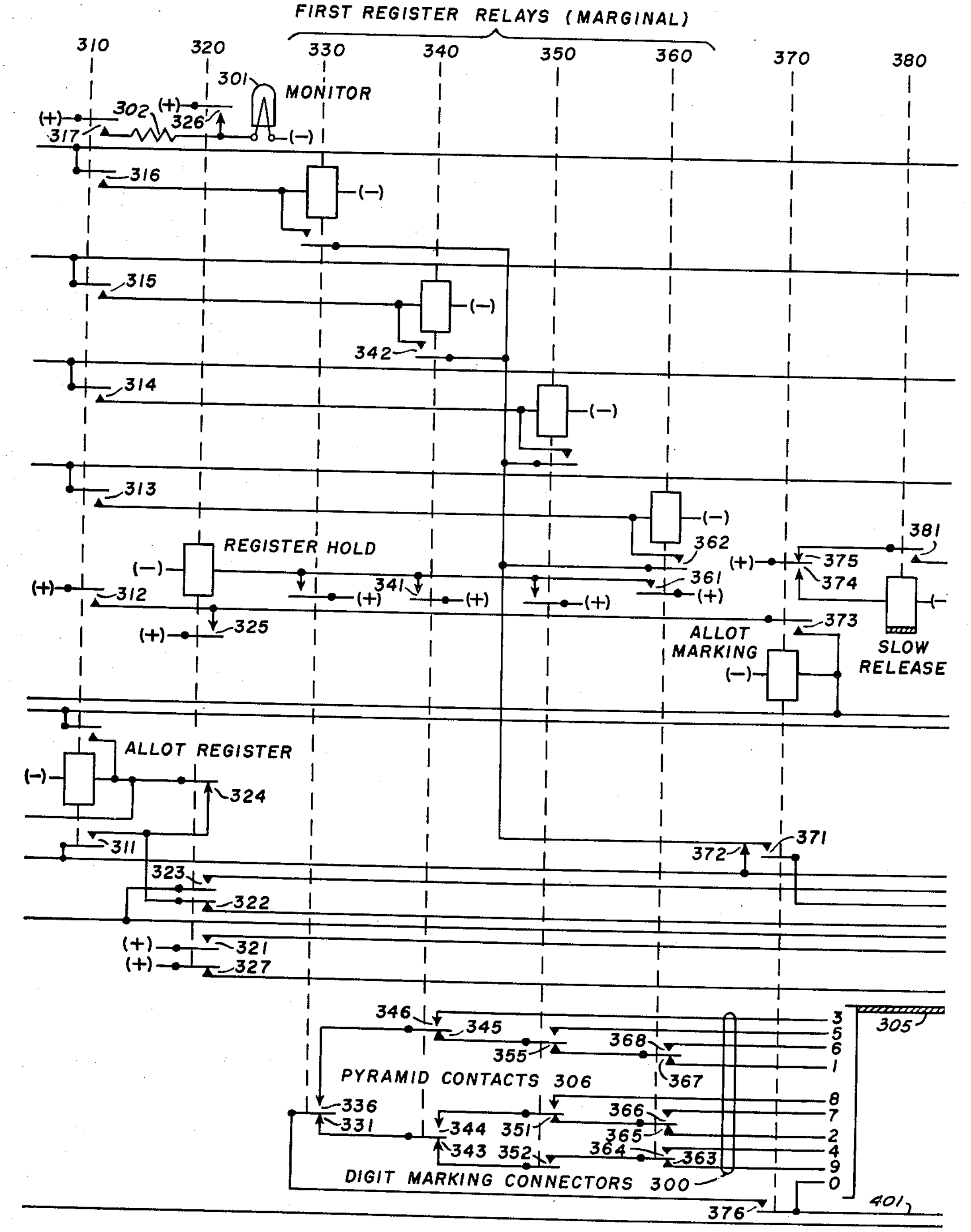
Figure 4:
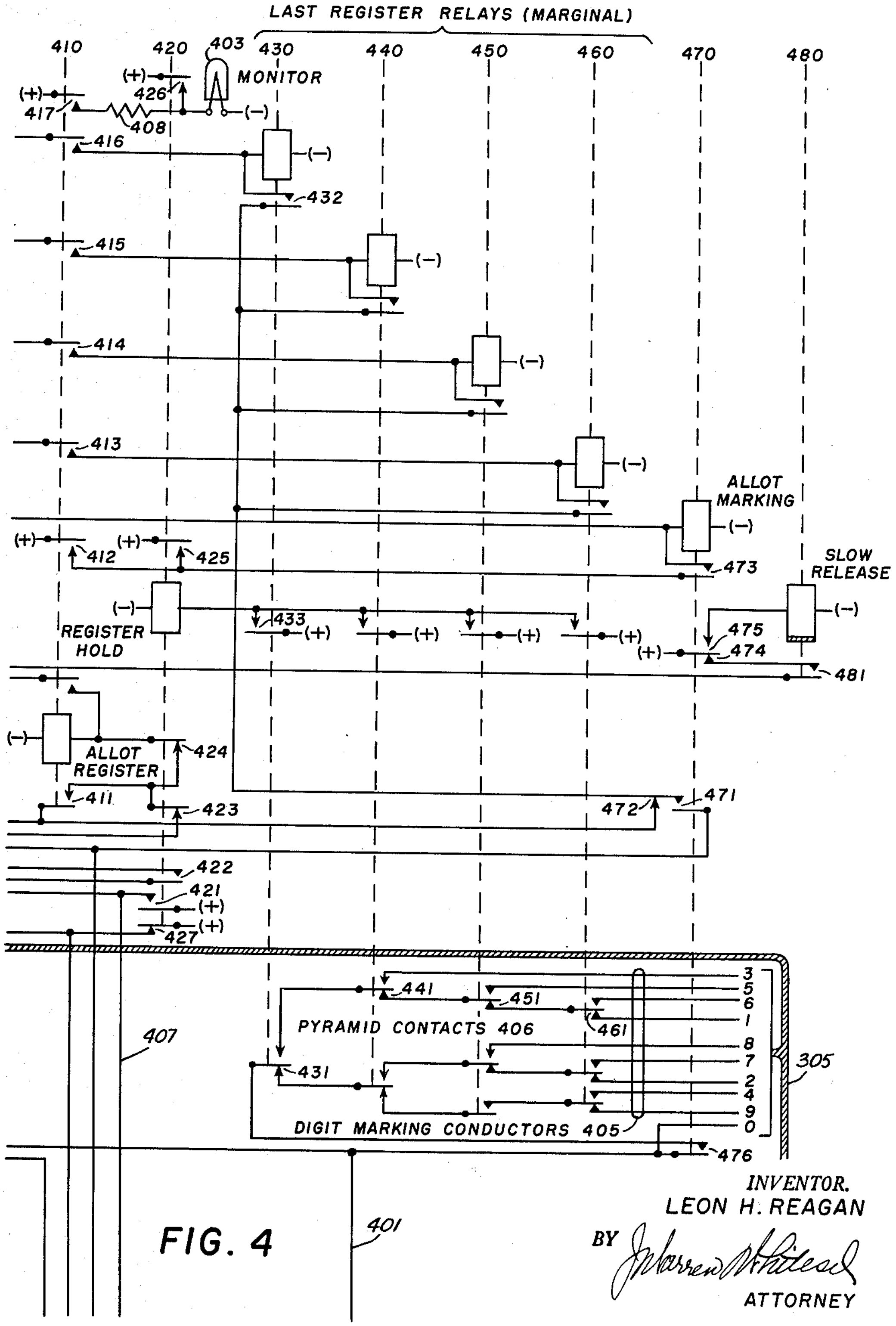
Figure 5:
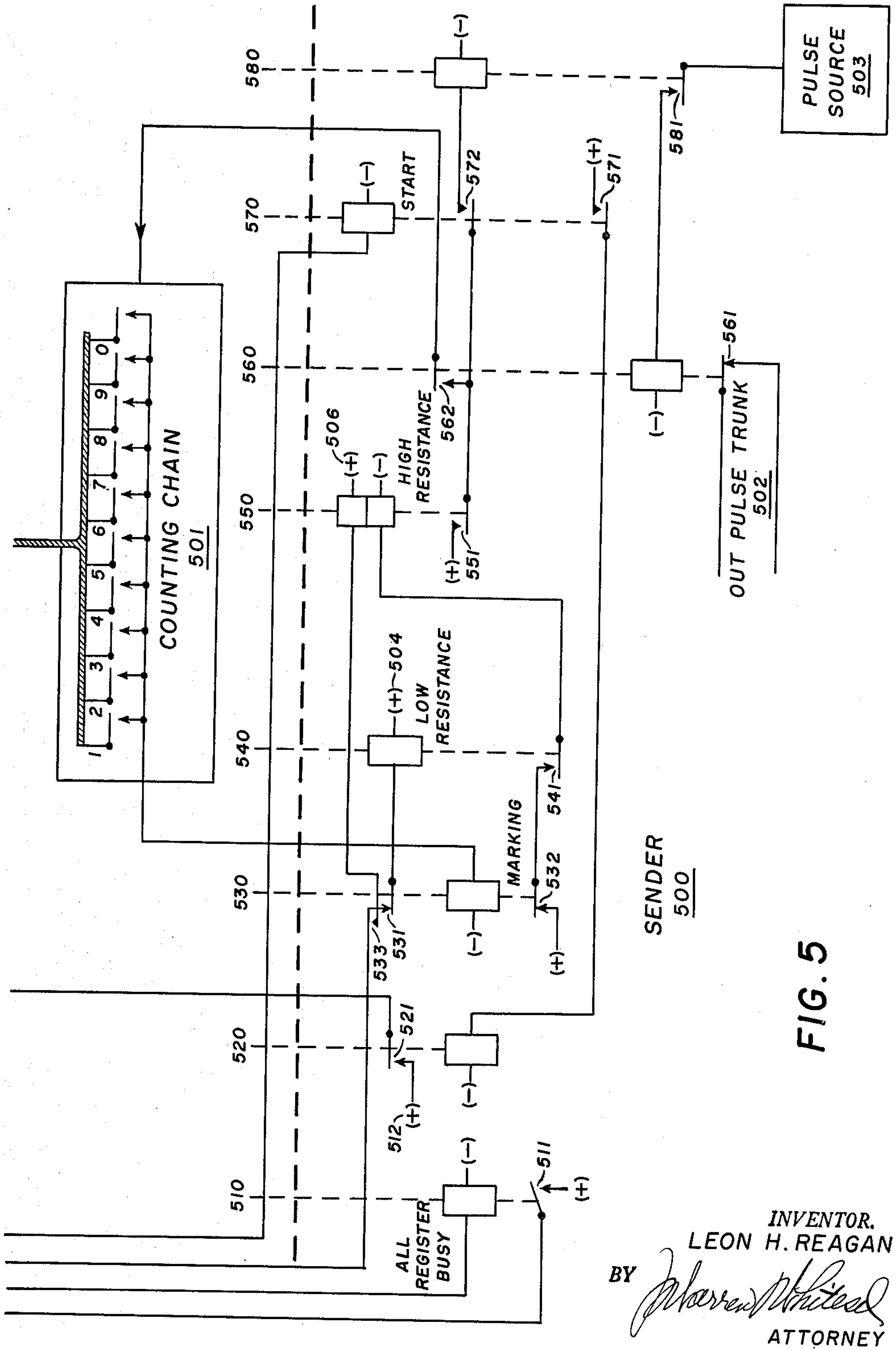
Fig. 5 shows a counting chain and sender circuit, partly in block form.

Figs 2, 3 and 4 show the function of key set 15, register controller 21, and register 33 which were shown as mere rectangles in Fig. 1. More specifically, Figs. 2–4 relate to Fig. 1 as follows: the digit keys 205 comprise key set 15, the operator's telephone circuit 200 provided with relay 201 and contact 202 are located in position circuit 11; relays 210—260 are part of the register controller circuit 21; while, Figs. 3 and 4 represent two of the register storage circuits, such as 33*a* and 33*f*, for example; and sender and counting chain circuit of Fig. 5 correspond with elements 34 and 35. It should be understood that any number of similar register storage circuits may be inserted as required. These circuits would then correspond to elements 33*b*—33*e* in Fig. 1. Each of the register storage circuits (Fig. 3 and Fig. 4) is provided with a set of pyramid contacts which are arranged to mark one of nine digit marking conductors, on an individual basis, depending upon which key was operated. That particular digit marking conductor, which is thus marked, serves to control sender 500 and counting chain circuit 501 over cable 305 which corresponds to cable 35*a* of Fig. 1. Sender 500 transmits the number of pulses indicated by counting chain circuit 501 over out pulse conductors 502 which are similar to conductor 32*a* of Fig. 1.

*Registration of digit marking*

The operator may seize the key sender and prepare to send various digit indications by operating relay 201 in any suitable manner thereby closing contacts 202 to operate position take relay 210. The operation of relay 210 is a preparatory indication that the apparatus of Figs. 2–4 may be used. First, though, it will be necessary to prepare one particular register storage circuit for use. For example, it was assumed above that circuit 33*e* (Fig. 1) is the first to be used on that particular call. In this instance it may be assumed that the register of Fig. 3 is the first to be used.

Relay 210 prepares the register of Fig. 3 for the registration of the first digit which the operator may wish to transmit by closing contacts 213 thereby to operate an allot register relay 310 which closes contacts 313—316 to identify the register of Fig. 3 as the next to operate. It may be noted that this circuit is by way of contacts 222 of a second position-take relay 220 which is a slow-operate relay, slave to relay 210; that is, its only function is to follow contacts 212 for measuring a predetermined time interval after position-take relay 210 has operated. Thus, the original energizing circuit for allot register relay 310 is closed only during the operate time of relay 220; however, before this circuit is open, relay 310 locks over the path from (−) battery, through relay 310 and contacts 324, 311 and 214 to grounded (+). Position-take relay 210 also closes contact 211 thereby extending grounded (+) over contacts 221 for operating allot marking relay 370 as an indication that this register is the first to control sender 500 because the first digit is registered here. Relay 370 also operates within the time required for slow-operate slave relay 220 to open its contacts 221; however, as in the case of relay 310, allot marking relay 370 locks before the slave relay operates. This locking path may be traced through contacts 373 to grounded (+) at contact 312 which were operated by allot register relay 310. Allot marking relay 370 also is effective to close a circuit at contacts 374 for the operation of relay 380 which has no purpose at this time. Later, relays 370 and 380 cooperate to connect sender 500 with that register containing the second digit. All of the preceding operation takes place during the slow operate time of position-take slave relay 220.

The register of Fig. 3 is now seized, but nothing is stored at this time. It is desirable to provide a signal means to indicate this stage of registration as an aid to maintenance personnel, such as the person using test equipment 39 (Fig. 1) for example. Thus, relay 310 closes contacts 317 thereby completing a circuit through resistance 302 to cause monitor lamp 301 to glow dimly. Later, when the digit marking is completed to the register of Fig. 3, contacts 326 will operate thereby shunting resistance 302 causing monitor lamp 301 to glow brightly.

The circuit is now in condition for the operator to register the first digit in the called number. For this purpose, the operator may actuate any one of the digit keys 205. An inspection of the digit keys shows that when each key is actuated, a different relay or pair of relays is operated. The combinations are as follows:

| Digit Key | Register Control Circuit Relays | Register Relays |
|---|---|---|
| 1 | 230 | 330. |
| 2 | 240 | 340. |
| 3 | 230 and 240 | 330 and 340. |
| 4 | 250 and 260 | 350 and 360. |
| 5 | 230 and 250 | 330 and 350. |
| 6 | 230 and 260 | 330 and 360. |
| 7 | 240 and 260 | 340 and 360. |
| 8 | 240 and 250 | 340 and 350. |
| 9 | 250 | 350. |
| 0 | 260 | 360. |

For the purpose of explanation, it may be assumed that on the first digit the operator moves key K7 in the direction of the arrow thereby closing the contact springs associated with this key. The lower set of springs completes a circuit from grounded (+) through contacts 206 to relay 240 and the upper set of contact springs completes a circuit to relay 260 from grounded (+) through contacts 207. Since allot register relay 310 is operated, each of the control relays completes a circuit extending from grounded (+) to a corresponding register relay. That is to say, grounded (+) 272 which is connected to rest contacts 271 and operated armature 243 is extended by way of operated contacts 315 to register relay 340 which operates and locks to a holding ground extended from grounded (+) 504 through the winding of low resistance relay 540 and contacts 531 in the sender circuit over a path which may be traced through operated contacts 371 and 342 to (−) battery through the winding of relay 340. In a similar manner, operated control relay 260 extends grounded (+) over operated contacts 264 and 313 to (−) battery through the winding of relay 360. This relay closes its contacts 362 and holds from grounded (+) 504 in sender circuit 500.

The digit "7" is now stored in the register of Fig. 3 since relays 340 and 360 are held operated. It is necessary to hold these relays independently of the control circuit of Fig. 2 since the operator is about to transmit the second digit and since sender 500 has not yet had time to transmit the necessary pulses over out pulse trunk 502. Thus, as each of the register relays operates, in this case relays 340 and 360, a circuit is completed at its lowermost contacts, for example, 341 and 361 from grounded (+) to (−) battery by way of register hold relay 320 which operates contacts 326 thereby causing lamp 301 to glow brightly as an indication that a digit is completely stored in the first register, Fig. 3. Relay 320 attracts its armature 324 thereby breaking the holding path for allot register relay 310 which drops to open contacts 313—316, thus breaking the connection between the control circuit of Fig. 2 and the register circuit of Fig. 3. Contacts 324 also will prevent the reassignment of the register of Fig. 3 before it again becomes idle, as will be explained later in the section entitled "All registers busy." The holding circuit for allot marking relay 370 is transferred from contacts 312 to contacts 325. It is necessary to start the sending operation as soon as possible after the digit is registered and therefore register hold relay 320 closes contacts 321 to extend a grounded (+) marking to sender start relay 570 which closes its contacts to control the transmission of digit pulses, about which more will be said later in the section entitled "Sender operation."

Meanwhile, the operator releases digit key K7 thereby de-energizing control relays 240 and 260—it will be recalled that register relays 340 and 360 are held independently at this time over a circuit extending to hold ground 504. Contacts 241 and 261 close responsive to the de-energization of control relays 240 and 260 so that a grounded (+) marking is extended from operated contacts 214 over rest contacts 231, 241, 251, 261, operated contacts 323, rest contacts 423 and 424 to allot register relay 410 and (−) battery, thus serving to mark this register as the next available. Relay 410 operates thereby attracting its armatures 413—416, thus connecting register relays 430—460 to control relays 230—260 of Fig. 2. At contacts 417, relay 410 completes a circuit via resistance 408 for causing monitor lamp 403 to glow dimly as an indication that the register of Fig. 4 has been seized, but no digit is stored therein as yet.

The register of Fig. 4 is now in a condition to receive a marking indicative of the second digit from the control circuit of Fig. 2. For the sake of explanation, let it be assumed that key K1 is actuated next in the direction of the arrow, thus closing a circuit from grounded (+) through contacts 208 to the register relay 230 which in turn attracts armature 233 for the purpose of transmitting a marking from grounded (+) 272 to relay 430 of Fig. 4, through rest contacts 271 and operated contacts 233 and 416. Relay 430 attracts its armature 432 thereby completing a holding circuit by way of resting contacts 472 to grounded (+) at operated contacts 214. The register relay operates register hold relay 420 as previously described in connection with relay 320 of the register of Fig. 3.

*Sender operation*

Sender 500 does not wait for the storage of the second digit, but rather commences sending as soon as possible without regard to whether the next digit has or has not been registered.

It will be recalled that register hold relay 320 operated start relay 570 as an indication that the sender may now transmit a train of impulses indicative of the first digit to be stored. That is, relay 570 operated over the circuits which may be traced from (−) battery through the winding of relay 570 and conductor 407 to grounded (+) on operated contacts 321. Start relay 570 closes its contacts 571 thereby closing an obvious circuit for operating relay 520. In operating, relay 520 closes its contacts 521 thereby extending a marking ground 512 over conductor 401 to pyramid contacts 306 or 406 depending upon which allot marking relay 370 or 470 is operated, which in this case is relay 370. Relay 570 also operates its contacts 572 to prepare a circuit to operate relay 580. It also will be recalled that register relays 340 and 360 of Fig. 3 operated responsive to the operation of digit key "7" and locked to holding ground 504 by way of low resistance relay 540. Relay 540, therefore, operates in series with the register relays—which are relays 340 and 360 in the case assumed. In operating, relay 540 closes its contacts 541 thereby operating relay 550 over a circuit including contacts 532 of marking relay 530. Relay 550 closes contacts 551 thereby operating relay 580 over the circuit including contacts 551 and 572.

The sender now is in condition to transmit the first train of impulses over out-pulse trunk 502, relays 520, 540, 550, 570 and 580 being now operated. Relay 510 may or may not be operated at this time, its operation being immaterial insofar as the sender is concerned.

Pulse source 503 is a device which continuously puts out cyclically recurring impulses having a uniform rate of repetition which is used to produce impulses that may be repeated over out pulse trunk 502. When relay 580 operates, it connects pulse source 503 with relay 560 by means of operated contacts 581; therefore relay 560 operates and releases cyclically responsive to each pulse from source 503. Each time that relay 560 operates, it opens contacts 561 thereby transmitting an open pulse over out pulse trunk 502. Simultaneously therewith, relay 560 closes contacts 562 thereby extending grounded (+) at operated contacts 551 to counting chain circuit 501 where any suitable device (not shown) sequentially opens and closes each of the contacts 1–0 in order, one contact being operated each time that relay 560 pulses contacts 562. In the example given above, the digit "7" was registered by the operation of relays 340 and 360; hence, marking ground 512 is extended by way of operated contacts 521 and 376 to pyramid contacts 306 where the circuit extends through rest contacts 331, operated contact 344, rest contacts 351, and operated contacts 366 to conductor 7 and over cable 305 to counting chain circuit 501. Contacts 1, 2, 3, 4, 5 and 6 of the counting chain circuit are closed in order, responsive to the pulsing of relay 560. Each of the conductors attached to these contacts is open at one or more of the contacts in pyramid contacts 306; therefore nothing happens. On the seventh impulse, contacts 7 close and the marking ground is connected with marking relay 530. Relay 530 operates to open its contacts 531 thereby releasing relay 540. The original operating circuit for relay 550 is now open at contacts 532 and 541.

Marking relay 530 also closes contacts 533 which connects the holding circuit for register relays 340 and 360 to grounded (+) 506 by way of the high resistance winding of relay 550. The register relays such as 340 and 360, for example, are marginal relays and will hold from ground 504 since the winding of relay 540 is of low resistance; however, the register relays will not hold in series with the high resistance winding of relay 550. Relay 550 does remain operated and holds contacts 551 closed for a brief interval during which register relays 340 and 360 release to open contacts 342 and 362 thus breaking the circuit over which relay 550 is holding. At this time contacts 551 open to release relay 580 which opens contacts 581 thereby removing pulse source 503 from connection with relay 560. Thus, relay 550 does not re-operate on the eighth pulse and hence the counting chain stops operating and no further out pulses are transmitted over trunk 502 by contacts 561. Removal of grounded (+) at contacts 551 and 562 will cause the counting chain to return to normal and release sender 500.

This operation prevents any attempt to transmit another digit pulse train before the complete release of the register which was just utilized for controlling the number of pulses transmitted over trunk 502. Otherwise, it might be possible for the sender to re-operate before the register releases completely in which case one or both of the register relays may be re-held from ground 504, thus transmitting an incorrect succeeding digit.

The sender 500 has completed the transmission of the first digit pulses and therefore it is prepared to transmit the next digit pulse train; thus, it is necessary to transfer the control of sender 500 to the register containing the next digit in the sequence which the operator used, in this case to the register of Fig. 4. For this purpose, allot marking relay 370 releases responsive to the release of register hold relay 320. That is, contacts 325 open the locking circuit to allot mark relay 370 which thereupon drops. Contacts 376 open to eliminate the circuit from marking conductor 401 through the pyramid contacts of relays 330—360 to digit marking conductors 300. Allot marking relay 370 also closes contacts 375 thereby completing a circuit for the operation of allot marking relay 470 over a path which may be traced from grounded (+) through contacts 375, operated contacts 381 to (—) battery by way of allot marking relay 470. Contacts 374 open the energizing circuit for relay 380. Hence, the circuit to relay 470 is completed for the slow release time period of relay 380 since after a brief interval, relay 380 drops to open contacts 381; however, allot marking relay 470 has already locked operated to grounded (+) on contacts 425 of register hold relay 420. (If registration of the second digit were not yet complete, relay 470 would lock to grounded (+) on contacts 412 temporarily.) The sender is now in condition to transmit the next train of impulses which we assumed to be the digit 1 which is indicated by relay 430 which is held operated at its contacts 432. Contact 431 is held operated so that the marking on conductor 401 is extended through operated contacts 476, of allot marking relay 470, operated contacts 431 and rest contacts 441, 451 and 461 to conductor 1. Once again the sender 500 scans the digit marking conductors transmitting a digit pulse on each conductor until the marked conductor is reached. In this case it is conductor 1 and therefore a single digit pulse is transmitted over out pulse trunk 502.

It will be noted that pyramid contacts 306 and 406 are arranged so that a different path is completed from marking ground on conductor 401 to marking conductors 300 or 405 depending upon which register relays are operated.

*Reassignment of first register*

The operator is not required to stop keying digit indications during sending; rather, the sender follows the registering without regard to the speed at which the operator is able to key the called number. For the sake of explanation, it may be assumed that the register of Fig. 3 is idle before the operator is ready to key the third digit; although in actual practice merely providing two registers would require the operator to adopt a slow speed keying technique—additional registers provide for higher speed operation.

As stated above, it is assumed that the first register (Fig. 3) has again become idle before the third digit is registered and that the last register (Fig. 4) still has the second digit registered therein. The operator releases the second digit key thereby completing the chain circuit extending from contacts 214. That is, control relay 230 which was operated on the second digit closes contacts 231 to extend grounded (+) on contacts 214 over closed contacts 231, 241, 251 and 261 to operated contacts 422 (the register of Fig. 4 being then operative to store a digit indication) rest contacts 322 (now closed and contacts 323 now open since the first register, Fig. 3, is idle and relay 320 released) to (—) battery by way of rest contacts 324 and the windings of allot register relay 310. This relay operates to attract contacts 313—316 once again to connect the register of Fig. 3 with the control relays of Fig. 2.

The operator now keys the third digit and the equipment of Figs. 2 and 3 function as before.

After a while the sender completes the transmission of a train of digit pulses representative of the digit indication stored in the register of Fig. 4 and is ready to send the next digit indication in the order in which it was stored. For this purpose, it is necessary to extend a marking from Fig. 4 to operate the allot marking relay 370 of Fig. 3 since this register contains the stored third digit. More specifically, the register relays release when holding ground 504 is removed at contacts 531 for a brief interval responsive to the sender finding a grounded digit marking conductor—in the example where the second digit was "1," relay 430 releases to open contacts 433 to drop register hold relay 420. Grounded (+) on contacts 425 is removed from the locking circuit of allot marking relay 470 causing this relay to release and close contacts 474 while opening contacts 475 thus de-energizing relay 480; however, this relay continues to hold for a brief interval due to its slow release characteristics. During this slow-release time interval a circuit is completed to the allot marking relay 370 of Fig. 3 via contacts 481. Relay 370 operates to close contacts 376 thus indicating that the digit marking stored in the register circuit of Fig. 3 is the next to control sender 500 and counting chain circuit 501, thus transmitting the third digit.

Hence, it may be noted that the registers and senders operate in what might be considered "a closed circle" operation. That is, a series of digit indications representing a called number is received from an operator key set by the register sender on each succeeding call. As it is received, each digit in the series is stored in order in the next succeeding idle register circuit. Each register circuit assigns the next idle circuit. The register of Fig. 3 operates and assigns the register of Fig. 4 which in turn operates and assigns the register of Fig. 3 again, ad infinitum. Meanwhile, the sender transmits digit pulses following each registration so that the register will be idle when the operator keys the next digit. On the next succeeding call, a new series of digit indications represent-the next called number is received. The first idle register after the last to be used on the previous call is assigned for receipt of the first digit in the second series. This process is repeated so that each series of digit impulses continues to be stored in the "closed circle" operation from the point at which the last succeeding series broke off regardless of any particular starting point or first register in the circle.

If six or eight registers were provided, the function would be the same except that the operator could key faster since then the sender could lag behind the registers as many as five or seven digits. As was indicated above, I have found that when eight registers are provided, very few, if any, operators are able to key fast enough for the registering process to complete the "circle" and overtake the sender thus meeting with an all register busy condition.

*All registers busy*

Means is provided for preventing the reassignment of a register before it again becomes idle. For example, let it be assumed that both of the registers (Figs. 3 and 4) are filled and that the operator attempts to key the next digit.

It will be recalled that allot register relay 310 originally operated over the circuit which may be traced from grounded (+) over operated contacts 213, rest contacts 222 through the winding of relay 310 to (—) battery. A brief time interval later, position take slave relay 220 operates to open contacts 222 thereby breaking the original operating circuit. This means that if allot register relay 310 is again to operate after it has once released, that operation must be by way of contacts 324 and 322 which are held open by operated register hold relay 320. In a similar manner, the register of Fig. 4 will not be reassigned since allot register relay 410 must operate through contacts 424 which are held open by register hold relay 420.

The operator should not actuate her digit keys when all registers are busy since signal lamp 207 directs her to stop keying. That is, when both registers (Figs. 3 and 4) are idle, grounded (+) is extended from contacts 327 and 427, to (—) battery through the winding of all register busy relay 510, thus holding it operated. When the first digit is stored in the register of Fig. 3, register hold relay 320 opens contacts 327, thus removing a grounded (+) marking previously extended to relay 510. When the second digit is stored in the register of Fig. 4, register hold relay 420 removes grounded (+) at contact 427. If the first register is again idle, relay 510 continues to hold from grounded (+) through contacts 327; however, if sender 500 has not yet transmitted a pulse train indicative of the digit stored in the first register, contacts 327 remain open and all register busy relay 510 releases to close contacts 511 thereby lighting lamp 207 as a stop keying signal, and operating lamp relay 270, which opens its contacts 271, removing grounded (+) from contacts of relays 230—260.

If the operator should depress a digit key too soon she would operate a relay or a pair of relays among the group 230—260 and the relay or relays which thus operate would have no effect, grounded (+) 272 having been removed from contacts 233, 243, 253 and 264 by operation of lamp relay 270.

After an interval, the sender completes transmission of a pulse train representing the digit stored in the first register and register hold relay 320 releases. Contacts 324 close and allot register relay 310 operates over the circuit from (−) battery through the winding of relay 310, contacts 324, 322, 422, 261, 251, 241, 231 to grounded (+) on contacts 214. Relay 310 operates contacts 313—316 to reassign the first register. In releasing register hold relay 320 also closes contacts 327 once again to operate all register busy relay 510 which in turn opens contacts 511 to extinguish lamp 207 as a start keying signal.

*"Run away" sender control*

Means is provided to prevent the sender from "running away" and transmitting an infinite number of pulses when, for any reason, the counting chain circuit fails to find a marked one of the digit marking conductors of cable 305. To illustrate, let us suppose that contact 366 fails to conduct properly when closed. In this case, assuming that the digit 7 was registered and that conductor 0 was not marked permanently from ground 512, the sender then would scan the digit marking conductors from 1–0 and since no ground marking is found, counting chain 501 would reach the end of its scanning without having operated marking relay 530 to stop the sender which then would "run away" sending an infinite number of digit impulses. Thus, it is desirable to provide some means for stopping the sender after all possible conductors have been scanned. For this purpose, the digit marking conductor 0 is permanently connected with marking ground 512 connected to conductor 401 by way of operated contacts 521. Thus, assuming that conductor 7 does not receive marking ground due to the dirty conditions of contacts 366, the counting chain will scan to the 0 conductor at which time it stops because of the direct ground marking. The sender transmits ten digit pulses which may cause a dialing error, but which prevents the sender from "running away." The dialing error will be detected quickly and the fault located and corrected or patching cord 34*a* (Fig. 1) may be used to select a trouble-free register sender.

Referring briefly to key KO which represents ten digit pulses, it will be noted that only register relay 360 (in the case of the register of Fig. 3) remains operated. Thus, contacts 364 are closed; however, contacts 352 are open. In this case, if an attempt is made to trace marking ground 512 over conductor 401, operated contacts 376 and through the pyramid contacts, the circuit must be by way of rest contacts 331 and 343; however, open contacts 352 prevents any conductor from being marked. It is to be noted therefore that conductor 0 must necessarily be connected directly to a marking ground on conductor 401 without regard to pyramid contacts 306. Thus, while counting chain 501 scans the digit marking conductors 300 on any digit other than 0, two conductors actually are marked, one of which corresponds to the digit indicated by the operated digit key, and the other of which is the conductor 0.

While I have shown only a single embodiment of my invention, I intend to claim not only these specific details but also such other modification as may fall within the true spirit of my invention.

What I claim is:

1. In a register sender, a pluarlity of register circuits each of which is operative to store a digit indication, said indication being the digits of a directory number, the number of register circuits being different from the number of digits in said directory number, a sender for transmitting a plurality of trains of digit impulses each of which corresponds to a digit stored in one of said registers, and means included in each register to assign the next idle register in a closed circle operation regardless of any particular starting point for storing the next succeeding digit indication, regardless of the position of said succeeding digit indication in said directory number.

2. A register sender comprising a plurality of register circuits each of which is operative to store an indication of a particular digit, said indication being the digits of a directory number, the number of register circuits being different from the number of digits in said directory number, means for seizing the next idle one of said registers regardless of any particular first register position for storing a next digit, said last named means being operative to seize said next idle register regardless of the position in said directory number of the one of said digits to be stored, means in said next idle register for assigning the next succeeding one of said registers to store the next digit of said directory number, means in said next register and means in each succeeding one of said registers for assigning the next succeeding register to store individually the next succeeding digits, means in the last of said registers for reassigning the first of said registers to be seized if it is then idle, whereby said registers are successively assigned ad infinitum without regard to the position of the digit being registered in the series of digits to be registered, and means for storing the first digit indication in the next directory number in the next idle register.

3. The register sender of claim 2 and a sender circuit for transmitting a plurality of trains of digit impulses each of which includes a number of pulses determined by the digit indication stored in a corresponding one of said registers, means for marking each of said registers idle after said sender transmits the train of digit impulses corresponding to the marking previously stored in that particular one of said registers.

4. In the register sender of claim 3, means for indicating an all-register busy condition, and means responsive to said indicating means for barring further use of said register circuits until a register becomes idle.

5. The register sender of claim 4 and means responsive to said indicating means for transmitting a stop dial signal thereby notifying an operator of an all-register busy condition.

6. A register sender comprising; a plurality of registers for storing the digits of a directory number, the number of digits in said directory number being different from the number of registers, control means, means for indicating digit designations, means for sequentially and individually associating each of said registers with said control means regardless of any particular first register, means responsive to the operation of any of said indicating means for causing said control means to store a digit indication in the first idle one of said registers without regard to the position of said digit in said directory number, means in said first idle register for assigning a second of said registers to receive and store a digit indication corresponding to the second operation of said indicating means, means in said second and means in each of said succeeding registers for assigning the next idle register, the last of said registers reassigning said first idle of said registers if it is then idle.

7. In the register sender of claim 6, a counting means for determining the indication stored in said first idle of said registers, a sending means for transmitting a train of outgoing impulses corresponding to the indication determined by said counting means, means in said sender for releasing said register and said counting means after a complete train of outgoing impulses have been transmitted.

8. In the register sender of claim 7 in which said sender comprises a pulse source, means responsive to said pulse source for developing outgoing impulses, and also responsive to said pulse source for controlling said counting means to test to determine whether or not another impulse is to be transmitted.

9. In the register sender of claim 8 and means for connecting in turn each succeeding one of said registers with said counting means and said sender.

10. A register sender comprising a plurality of registers, a sender, a plurality of circuit means for holding said registers operated, a first hold means, one of said circuit means being connected with said first hold means while said sender transmits impulses corresponding to an indication stored in that one of said registers which corresponds to said one circuit means, a second hold means, and means for transferring said circuit means from said first hold means to said second hold means after said sender completes the transmission of said impulses, means in said register responsive to said second hold means for releasing said register while holding said sender, and means responsive to the release of said register for releasing said sender.

11. The register sender of claim 10 in which said first hold means is an element having a predetermined resistance and said second hold means is an element having a resistance which is different from said predetermined resistance.

12. A register sender circuit comprising a plurality of registers, counting means successively and sequentially connected with each of said registers, a sender, means in said sender for successively operating said counting chain one step at a time to test for a marking extended from one of said registers, means responsive to said advancing means for transmitting an outgoing impulse on each advance of said counting chain, means for releasing said one register when said counting chain reaches a marking, and means responsive to the release of said one register for releasing said sender and counting chain.

13. In a register sender, a plurality of registers, means for sequentially and successively assigning each of said registers in a closed circle operation to store a first series of digit indications, and means for storing a second series of digit indications beginning in the next idle of said registers regardless of any particular first register.

14. The register sender of claim 13 and signal means for indicating which of said registers contain stored information and which of said registers is assigned to store the next succeeding digit.

15. The register sender of claim 14 in which said signal means comprises a lamp that glows at one level of illumination when said register contains stored information and which glows at a second level of illumination when said register is assigned to store the next succeeding digit.

16. In a telephone system, an operator position, digit keys at said position for keying the digits of directory numbers, a control circuit connected with said digit keys, a plurality of register circuits each of which may be successively and sequentially assigned to said control circuit for storing a digit indication in each register, the number of registers being different than the number of digits in said directory number, means responsive to the operation of any of said digit keys for causing said control circuit to control the storage of a corresponding information in one of said register circuits, means for successively and sequentially assigning each of said registers in closed circle operation regardless of any particular starting point to be controlled by said control circuit to store said directory number, the last of said registers reassigning the first of said registers if it should then be idle, and means for storing the next directory number in said registers beginning with the next idle register.

17. The register sender of claim 16 in which each of said register circuits is provided with a monitor lamp, means for causing said lamp to glow at one level of illumination when information is stored in the corresponding register, means for causing said monitor lamp to glow at a second level of illumination when the corresponding register is assigned to store the next information, and means for extinguishing said monitor lamp when the corresponding register is idle.

18. The register sender of claim 16 and a sender, a plurality of conductors, means for operatively connecting said conductors successively and sequentially between each of said registers and said sender, means for selectively marking any one of said conductors, and means for permanently marking the last one of said conductors.

19. The register sender of claim 16 and a sender, means for successively and sequentially connecting said sender to each of said registers in order, means in said sender for transmitting a train of outgoing impulses corresponding to information stored in said register circuit, means in said sender for then releasing said register, and means in said register responsive to said release for releasing said sender.

20. A register sender comprising a plurality of registers, means for sequentially storing a plurality of digit indications in said registers, each succeeding indication being stored in the next succeeding register, means for holding each register to maintain said stored digit indication, a sender, means for operating said sender to transmit a train of digit pulses corresponding to the digit indication stored in each of said registers, means for holding said sender following transmission of each of said trains of digit pulses, means in said sender responsive to the complete transmission of a train of digit pulses for releasing that one of said registers which stored the corresponding digit indication, means responsive to release of said one register for releasing said sender, means also responsive to release of said one register for connecting said sender to be controlled by the next one of said registers, and means for repeating said cycle of sending operations until each of said stored digit indications is transmitted by said sender in the form of an outgoing pulse train.

21. The register sender of claim 20, and a low resistance relay and a high resistance relay, said means for holding said register comprising a circuit extended through said low resistance relay, said means for holding said sender comprising said circuit extended through said high resistance relay, means for switching said circuit from connection through said low resistance relay to connection through said high resistance relay, said means for releasing said register comprising marginal relay means which release responsive to operation of said switching means and said means for releasing said sender comprising contacts opened on release of said marginal relay.

22. The register sender of claim 21 and means in said register sender for receiving a plurality of succeeding series of digit indications, said means for sequentially storing said indications storing the first indication in each of said series in the next idle one of said registers regardless of any particular first register.

23. A register sender comprising a plurality of registers, marginal relays in each of said registers, means for selectively operating said marginal relays to store a digit indication in each of said registers, a sender, a relay having low resistance winding and a relay having a high resistance winding in said sender, means for extending a holding circuit through the winding of said low resistance relay to hold said marginal relays operated, means responsive to one of said stored digit indications for controlling said sender to transmit a train of digit pulses corresponding to said one digit indication, means responsive to complete transmission of said train of digit pulses for switching said holding circuit from a connection through said low resistance winding to a connection through said high resistance winding, said marginal relays being adjusted to release responsive to said switching, means responsive to release of said marginal relays for releasing said high resistance relay and means responsive to operation of said high resistance relay for holding said sender busy and to release of said high resistance relay for marking said sender idle.

24. The register sender of claim 23 and means also responsive to release of said marginal relays for assigning said sender to be controlled by the next of said registers whereby a second digit pulse train is transmitted responsive to the digit indication stored in said next register and means for repeating said register-sender operations until each of the stored digit indications is used by said sender to transmit an outgoing train of digit impulses corresponding to said stored indications.

25. The register sender of claim 24 and means for sequentially assigning the next idle of said registers for receiving the next digit indication regardless of any particular first register.

26. A telephone system comprising an operator position, means for extending a plurality of calls to said operator positions, a register sender comprising a plurality of register circuits, means at said operator position for sequentially storing a plurality of digit indications in series groupings, each of said series being individual to a particular call, means for storing each of said digit indications in one of said registers, means in each of said registers for assigning the next idle register and means in the last of said registers for re-assigning the first of said register circuits to prepare for storing the next of said digits, means for storing the first digit of each of said succeeding series in the next idle register after the last register to be used in storing the last digit in the next preceding series.

27. A telephone system comprising; a plurality of register circuits, means for sequentially storing a series of called digit indications in said registers, means in each of said registers for assigning the next idle of said digit registers and means in the last of said registers for re-assigning the first of said registers for storing the next digit indication, means for storing the first in the next of said series of digit indications in the first idle of said registers available after storage of the last indication in the preceding of said series of digit indications regardless of a starting or an ending position in said registers.

References Cited in the file of this patent

UNITED STATES PATENTS

| | | |
|---|---|---|
| 1,509,691 | Richardson | Sept. 23, 1924 |
| 1,540,043 | Turner | June 2, 1925 |
| 2,167,710 | Crocker | Aug. 1, 1939 |
| 2,333,485 | Molnar | Nov. 2, 1943 |
| 2,353,212 | Balzer | July 11, 1944 |
| 2,511,145 | Balzer | June 13, 1950 |